(12) United States Patent
Morici et al.

(10) Patent No.: US 12,218,783 B2
(45) Date of Patent: Feb. 4, 2025

(54) INTEGRATED CIRCUIT WITH GALVANIC ISOLATION

(71) Applicant: Infineon Technologies Austria AG, Villach (AT)

(72) Inventors: Andrea Morici, Padua (IT); Thomas Ferianz, Bodensdorf (AT)

(73) Assignee: Infineon Technologies Austria AG, Villach (AT)

( * ) Notice: Subject to any disclaimer, the term of this patent is extended or adjusted under 35 U.S.C. 154(b) by 307 days.

(21) Appl. No.: 17/964,959

(22) Filed: Oct. 13, 2022

(65) Prior Publication Data
US 2023/0117387 A1  Apr. 20, 2023

(30) Foreign Application Priority Data

Oct. 19, 2021  (EP) ..................................... 21203375

(51) Int. Cl.
*H02M 3/335* (2006.01)
*H04L 25/02* (2006.01)
(52) U.S. Cl.
CPC ................................ *H04L 25/0266* (2013.01)
(58) Field of Classification Search
CPC .......... H02M 3/33523; H02M 3/33592; H04L 25/0266
See application file for complete search history.

(56) References Cited

U.S. PATENT DOCUMENTS

| 6,262,600 | B1 * | 7/2001 | Haigh ................... H04L 25/493 326/82 |
| 6,480,602 | B1 * | 11/2002 | Dupuis ............... H04L 25/0266 379/90.01 |
| 2013/0088264 | A1 | 4/2013 | Barrenscheen et al. |
| 2013/0257527 | A1 * | 10/2013 | Dong ...................... H01L 24/49 257/532 |

(Continued)

FOREIGN PATENT DOCUMENTS

| EP | 3447798 A2 | 2/2019 |
| EP | 3447798 A3 | 4/2019 |
| GB | 2537394 A  | 10/2016 |

OTHER PUBLICATIONS

Extended Search Report, EP 21 203 375.7, Apr. 5, 2022, pp. 1-10.

*Primary Examiner* — Jue Zhang
*Assistant Examiner* — Lakaisha Jackson
(74) *Attorney, Agent, or Firm* — Armis IP Law, LLC (57) ABSTRACT

An integrated circuit with galvanic isolation is described herein. In accordance with one example, the circuit comprises a galvanic insulation barrier including a first isolation element configured to separate a first isolation domain from a second isolation domain and a first channel configured to transmit—in a first mode of operation and across the first isolation element—a logic signal from a first input in the first isolation domain to a first output in the second isolation domain. The first channel is further configured to transmit—in a second mode of operation and across the first isolation element—a serial data stream from the first input to a logic (Continued)

circuit in the second isolation domain, wherein the logic circuit is configured to receive—in the second mode of operation—the serial data stream and to store configuration information included in the serial data stream in a memory.

13 Claims, 4 Drawing Sheets

(56) References Cited

U.S. PATENT DOCUMENTS

| | | | |
|---|---|---|---|
| 2014/0253227 A1* | 9/2014 | Yach | H01L 23/49575 |
| | | | 327/540 |
| 2019/0267793 A1 | 8/2019 | Hematy | |
| 2022/0115941 A1* | 4/2022 | May | H03K 17/689 |

* cited by examiner

INTEGRATED CIRCUIT WITH GALVANIC ISOLATION

RELATED APPLICATION

This application claims priority to earlier filed European Patent Application Serial Number EP21203375 entitled "INTEGRATED CIRCUIT WITH GALVANIC ISOLATION," filed on Oct. 19, 2021, the entire teachings of which are incorporated herein by this reference.

TECHNICAL FIELD

The present disclosure relates to the field of dual-die or multi-die integrated circuits (ICs) with a galvanic insulation barrier between two or more dies.

BACKGROUND

In many applications, in which a galvanic isolation is needed, special isolation ICs are used to transfer information from one side of the insulation barrier to the other side of the insulation barrier and vice-versa. These isolation ICs include a galvanic insulation barrier to electrically separate two isolation domains at each side of the insulation barrier. The isolation IC may have one or more dies for each isolation domain and data is exchanged between the isolation domains across the galvanic insulation barrier via inductive, capacitive or optical signal transmission.

In an application with two isolation domains, the communication between the two domains is accomplished by transferring signals across the insulation barrier. One important example of inductive signal transmission are integrated coupled inductors also referred to as coreless transformers. This concept can be readily enhanced to three or more isolation domains. The signals transferred from one isolation domain to another isolation may be PWM (pulse-width modulated) signals, bit stream signals used for serial data transmission or the like. Signals may be exchanged in both directions, from one isolation domain to another isolation domain and vice versa. Usually one transmission channel is needed for each signal to be transferred, wherein each channel includes at least a coreless transformer (or any other galvanically isolating circuitry). Dependent on the application, the isolation ICs may also be referred to a "digital isolators, "isolated gate drivers", "isolated bus transceiver", or the like.

In isolation ICs a non-volatile memory is often used to store information used for parametrization of the isolation IC. Parametrization allows to customize the IC for a specific application. Different product variants may be provided by storing specific parameters in a generic isolation IC. The stored parameter information may include UVLO (undervoltage lockout) levels, safe state default outputs, channel direction (forward and backward), number of channels used, etc. The parameter information may be stored in the non-volatile memory of the isolation IC during a production test (end-of-line test) of the product, but can also be performed while the product is used in a specific application. The information may be, for example, used during startup or during operation of the product.

The non-volatile memory may be implemented in one isolation domain, in some of the isolation domains or in all isolation domains. In case of a dual-die IC with two isolation domains (e.g. in a digital isolator) each die may have a non-volatile memory. In case of a multi-die IC for example with three dies and two isolation domains, one of the three dies (usually the input die at the input side) may have a non-volatile memory while other dies (usually the output dies) may have only a set of volatile registers that are configured during product startup or operation.

For the purpose of parametrization it may not be possible or desirable to access the memory in dies/isolation domains. For example, if the product test is done when the dies are already in the chip package (backend test), the memories in the different dies may not be accessible via the chip pins. Also in the frontend test (before packaging of the dies), accessing each memory may be inefficient and costly and thus undesirable.

The inventor identified the need for improvements with regard to the parametrization of isolation ICs.

SUMMARY

The above-identified problem can be solved by the integrated circuit and methods as discussed herein. Various embodiments and further developments are covered by the dependent claims.

An integrated circuit with galvanic isolation is described herein. In accordance with one example, the circuit comprises a galvanic insulation barrier including a first isolation element configured to (i.e., operative to) separate a first isolation domain from a second isolation domain and a first channel configured to transmit—in a first mode of operation and across the first isolation element—a logic signal from a first input in the first isolation domain to a first output in the second isolation domain. The first channel is further configured to transmit—in a second mode of operation and across the first isolation element—a serial data stream from the first input to a logic circuit in the second isolation domain, wherein the logic circuit is configured to receive—in the second mode of operation—the serial data stream and to store configuration information included in the serial data stream in a memory.

Furthermore a method is described herein. In accordance with one example, the method includes transmitting—in a first mode of operation of an integrated circuit and across a first isolation element of the integrated circuit—a logic signal from a first input in a first isolation domain of the integrated circuit to a first output in a second isolation domain of the integrated circuit, wherein the first and the second isolation domains are separated by a galvanic insulation barrier including a first isolation element. The method further includes transmitting—in a second mode of operation and across the first isolation element—a serial data stream from the first input to a logic circuit in the second isolation domain, and receiving—by the logic circuit and in the second mode of operation—the serial data stream and storing configuration information included in the serial data stream in a memory.

BRIEF DESCRIPTION OF THE DRAWINGS

The invention can be better understood with reference to the following drawings and descriptions. The components in the figures are not necessarily to scale; instead emphasis is placed upon illustrating the principles of the invention. Moreover, in the figures, like reference numerals designate corresponding parts. In the drawings.

DETAILED DESCRIPTION

Figure 1:
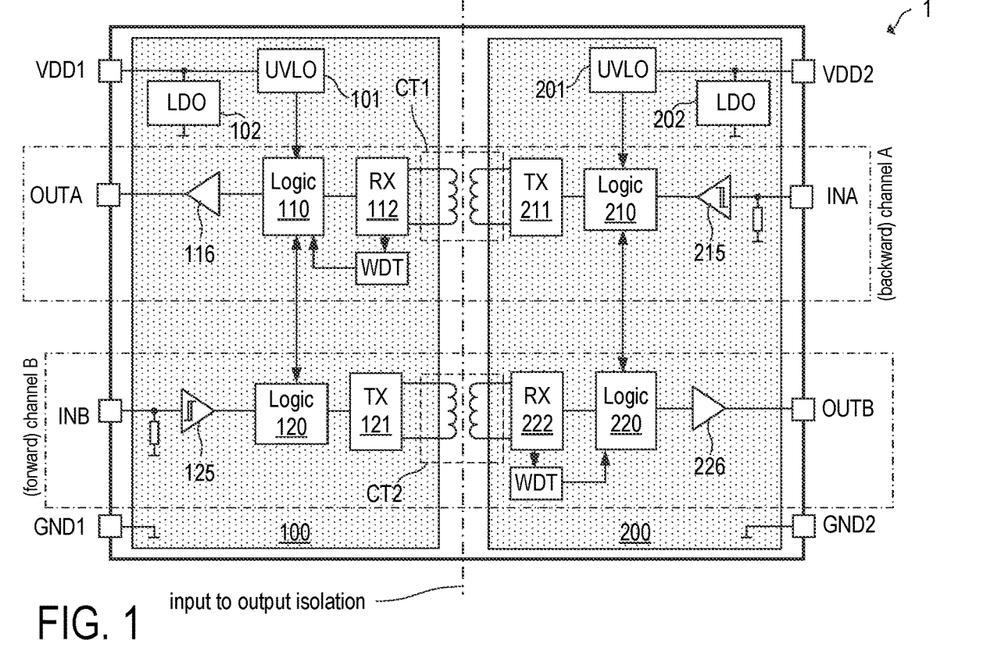
FIG. 1 illustrates one example of a dual-die isolation IC with one forward channel and one backward channel.

FIG. 1 illustrates one example of an isolation IC, which is a digital isolator 1 in the depicted example. It is understood that a digital isolator is merely one exemplary application of the concepts discussed herein which can readily applied to other types of galvanically isolated integrated circuits such as isolated gate drivers, isolated bus transceivers, etc. The digital isolator 1 of FIG. 1 includes two semiconductor dies 100, 200 which include circuitry of two respective isolation domains. The galvanic insulation barrier is implemented by coreless transformers CT1 and CT2, wherein the primary and secondary coils of the coreless transformers may be arranged in one of the semiconductor dies 100, 200, wherein the other one of the semiconductor dies 100, 200 is electrically connected to the coreless transformers CT1, CT2 via bond wires.

As can be seen from FIG. 1, the digital isolator has two communication channels, herein referred to as backward channel A and forward channel B Channel A allows the transmission of a signal from the die 200 to the die 100 (i.e. in the backward direction), whereas channel B allows communication in the other (forward) direction. It is understood that the terms "forward channel" and "backwards" channel are merely names helping to distinguish the direction of the communication. The names do not imply a specific function or structure. In fact, the two channels A and B are constructed symmetrically in the present example. In other examples, an isolation IC may include only forward channels or only backwards channels.

An input signal (e.g. a bit stream, a PWM signal, etc.) received at input pin INA (coupled to semiconductor die 200) is transmitted via backward channel A across the insulation barrier using the coreless transformer CT1. Similarly, an input signal received at input pin INB (coupled to semiconductor die 100) is transmitted via forward channel B across the insulation barrier using the coreless transformer CT2.

The input signal received at pin INA is a logic signal provided to comparator 215, which may be a Schmitt Trigger. The comparator 215 is used for signal shaping, and, accordingly, the output signal of the comparator 215 corresponds to the input signal but has a defined signal level with defined rise and fall times. The logic circuit 210 may modify the logic signal received from comparator 215. However, for the present discussion it is assumed that the logic circuit 210 is transparent and forwards the logic signal to the transmitter (TX) circuit 211. Other aspects of the logic circuit will be described later.

The TX circuit 211 injects a current signal into the primary coil of the coreless transformer CT1, whereas the current signal is modulated in accordance with the logic signal received at the input of the TX circuit 211. For example, a rising edge of the logic signal may be represented as a first symbol and a falling edge of the logic signal may be represented as a second symbol, wherein each symbol is represented by a specific modulation of the current injected into the primary coil.

The modulated current injected into the primary coil of transformer CT1 induces a respective secondary current or voltage in the secondary coil of transformer CT1. The receiver (RX) circuit 112 is configured to receive the induced current/voltage from the secondary coil and to reconstruct the logic signal therefrom, which is output by the RX circuit 112. The logic signal provided by RX circuit 112 is forwarded to the output driver 116 by the logic circuit 110 (which is also assumed to be transparent for the current discussion), and the output driver 116 outputs a respective logic signal at the output pin OUTA of the integrated circuit.

The components of forward channel B operate analogously to the components of backward channel A. Accordingly, the input signal received at pin INB is a logic signal provided to comparator 125, which may be a Schmitt Trigger (like comparator 215). The comparator 125 is used for signal shaping, and, accordingly, the output signal of the comparator 125 corresponds to the input signal but has a defined signal level with defined rise and fall times. The logic circuit 120 may modify the logic signal received from comparator 125 as discussed above with regard to logic circuit 210. Again, for the present discussion it is assumed that the logic circuit 120 is transparent and forwards the logic signal to the transmitter (TX) circuit 121.

The TX circuit 121 injects a current signal into the primary coil of the coreless transformer CT2, whereas the current signal is modulated in accordance with the logic signal received at the input of the TX circuit 121. Concerning the function of TX circuit 121, reference is made to the above explanation of TX circuit 211, which may be substantially identical to TX circuit 121.

The modulated current injected into the primary coil of transformer CT2 induces a respective secondary current or voltage in the secondary coil of transformer CT2. The receiver (RX) circuit 222 is configured to receive the induced current or voltage from the secondary coil and to reconstruct the logic signal therefrom, which is output by the RX circuit 222. The logic signal provided by RX circuit 222 is forwarded to the output driver 226 by the logic circuit 220 (which is also assumed to be transparent for the current discussion), and the output driver 226 outputs a respective logic signal at the output pin OUTB of the integrated circuit.

The circuits labeled "WDT" represent watchdog circuits. The watchdog circuits include a timer, which trigger a safety mechanism of logic circuits 110 and 220, if the respective receivers 112 and, respectively, 222, do not receive pulses/symbols via the coreless transformers for more than a specific time. The mentioned safety mechanisms are capable to set the output pads OUTA and OUTB to a defined default state (e.g. a Low level or a High level) in order to bring the system to a safe state in case of interrupted communication across the coreless transformers. Watchdog circuits as such are known and are thus not explained in more detail herein.

The integrated circuit of FIG. 1 also includes a supply pin VDD1 and a ground pin GND1 coupled to semiconductor die 100 and a supply pin VDD2 and a ground pin GND2 coupled to semiconductor die 200. A voltage regulator 102 is integrated in semiconductor die 100, coupled to supply pin VDD1 and ground pin GND1 and configured to provide a regulated supply voltage for the circuit components in semiconductor die 100 (first isolation domain) Similarly, a voltage regulator 202 is integrated in semiconductor die 200, coupled to supply pin VDD2 and ground pin GND2 and configured to provide a regulated supply voltage for the circuit components in semiconductor die 200 (second isolation domain) The voltage regulators 102 and 202 may be low drop-out (LDO) regulators. Furthermore, the semiconductor dies 100 and 200 may include UVLO (under-voltage lockout) circuits 101 and 201, respectively. These UVLO circuits 101, 201 may signal the detection of an undervoltage to the logic circuits 110 and 120 in semiconductor die 100 and, respectively, to the logic circuits 210 and 220 in semiconductor die 200. UVLO circuits as such are known and thus not further discussed herein in more detail.

Figure 2:
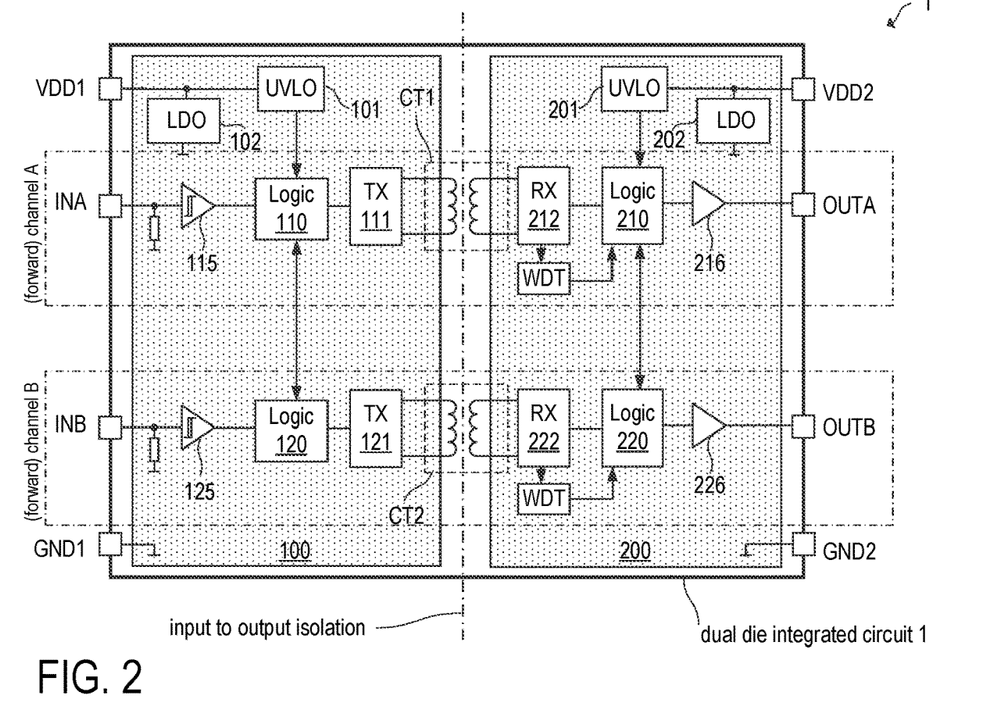
FIG. 2 illustrates another example of a dual-die isolation IC with two forward channels.

The isolation IC of FIG. 1 is referred to as being in a 1+1 configuration as there is one channel in one direction (forward) and one channel in the other direction (backward). FIG. 2 is an example of an isolation IC in a 2+0 configuration. That is, the IC has two channels allowing communication in the same direction (e.g. forward direction).

The example of FIG. 2 is identical to the example of FIG. 1 except that channel A is "reversed". That is, channels A and B enable signal transmission in the same direction (i.e. the forward direction). The components of channel B of the isolation IC of FIG. 2 are identical to the components of channel B of the isolation IC of FIG. 1. Channel A of the isolation IC of FIG. 2 includes corresponding components. That is, comparator 115, logic circuit 110, TX circuit 111, transformer CT1, RX circuit 212, logic circuit 210 and output driver 216 of channel A correspond to comparator 125, logic circuit 120, TX circuit 121, transformer CT2, RX circuit 222, logic circuit 220 and, respectively, output driver 226 of channel B. The remaining components (e.g. voltage regulator and UVLO circuits are the same as in FIG. 1 and reference is made to the description above. In FIG. 2, channels A and B may also be seen as backward channels. However, in the following explanations, a 2+0 configuration is considered to have two forward channels and no backward channels.

Figure 3:
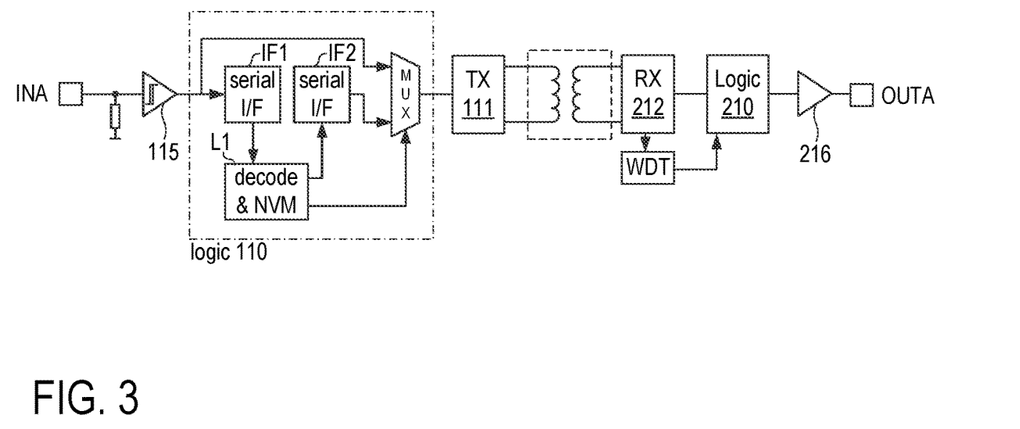
FIGS. 3 and 4 illustrate example implementations of the two logic circuits (integrated in different isolation domains) included in the dual-die IC of FIG. 2.
Figure 4:
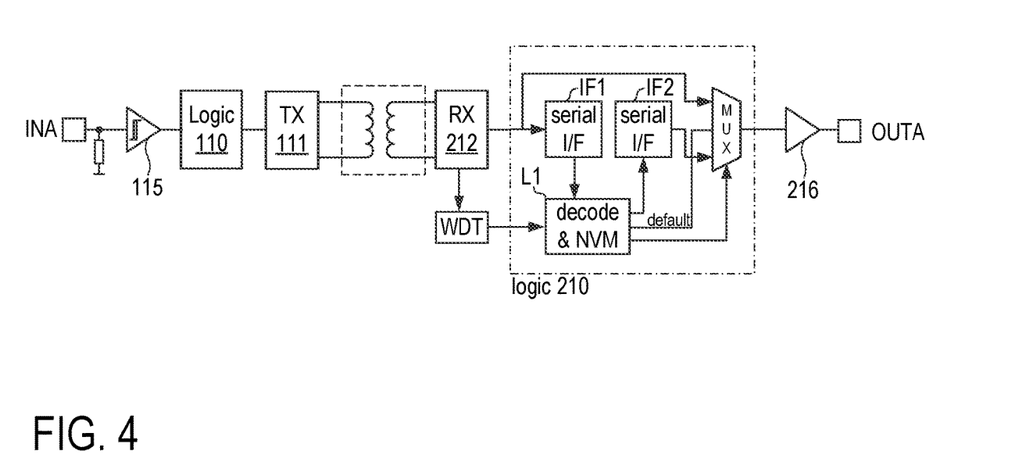

FIGS. 3 and 4 illustrate exemplary implementations of the two logic circuits 110 (cf. FIG. 3) and 210 (cf. FIG. 4), included in the forward channel A of the isolation IC 1 of FIG. 2. The logic circuits 120 and 220 of channel B may be constructed in the same way as the logic circuits 110 and 210 of channel A. It is noted that, dependent on the implementation, the logic circuits of one die can be actually designed as one (single) logic circuit. In such an example, the functions of logic circuits 110 and 120 would be provided by one logic circuit integrated in semiconductor die 100. Similarly, the functions of logic circuits 210 and 220 would be provided by one logic circuit integrated in semiconductor die 200. However, for the purpose of illustration it may be advantageous to consider separate logic circuits in different channels.

In the example of FIG. 3, the logic circuit 110 includes two communication interfaces IF1, IF2 for serial communication. The communication interfaces IF1 and IF2 may operate in accordance with a specific communication standard such as, for example, SPI (Serial Peripheral Interface). It is understood that SPI is merely one example and other types of serial communication may be used (e.g. in accordance with the I²C bus standard). The serial communication may be frame-based, i.e. data is received in packets corresponding to the frame-length (e.g. 8, 12 or 16 bits).

The serial interface IF1 is coupled to the output of comparator 115 and is configured to process a serial data stream received at input pad INA. The received data included in the serial data stream is provided to circuit L1 which is configured to process (decode) the received data and store information in a non-volatile memory (NVM) included in circuit L1. The serial interface IF2 is coupled to circuit L1 and configured to receive a serial data stream provided by circuit L1 and to transmit this serial data stream across the coreless transformer CT1 via multiplexer MUX and transmitter circuit 111. Accordingly, the circuit L1 is capable of communicating with circuit components integrated in the other isolation domain, in particular with logic circuit 210.

As can be seen in FIG. 3, the circuit L1 as well as the communication interfaces IF1, IF2 can be bypassed by directly connecting the input of the logic circuit 110 with the respective output using the multiplexer MUX. In this situation, the logic circuit 110 is "transparent", i.e. the logic signal received at the input is simply forwarded to the respective output of the logic circuit 110, and the logic circuit 110 operates in "transparent mode". In transparent mode, the logic signal transmitted across the insulation barrier may be any logic signal such as, for example, a pulse-width modulated (PWM) signal. It is understood that, in transparent mode, any other modulation type may be used dependent on the application (e.g. pulse-frequency modulation, PFM, sigma-delta-modulation, SDM, or the like). In contrast, in another mode of operation referred to as configuration mode, a serial bit-stream can be received by serial interface IF1 and processed by circuit L1. The control of the multiplexer MUX is dependent on the mode of the respective logic circuit, i.e. transparent mode or configuration mode. The mode may be selected based on the voltage level received at the supply pins VDD1 and VDD2 associated with the respective isolation domain (see also FIG. 8 and respective description). In one example, when a specific "password" (bit sequence) is received in configuration mode, the NVM and the logic circuit's registers may become accessible and the multiplexer may be controlled accordingly (e.g. to bypass the logic circuit in transparent mode).

The logic circuit 210 shown in FIG. 4, may be constructed very similar to the logic circuit 110 of FIG. 3. Accordingly, logic circuit 210 also includes serial communication interfaces IF1, IF2, as well as a multiplexer MUX and the circuit L1 which, inter alia, controls the multiplexer MUX. On the receiver's side, the multiplexer may be controlled to output a default signal level in the event that no data is received via the insulation barrier. Again, logic circuit 210 can be operated in transparent mode, in which the logic signal received from the receiver circuit 212 is directly forwarded (using the multiplexer MUX) to the output driver 216. Furthermore (e.g. in configuration mode), the circuit L1 of logic circuit 210 may generate a serial bit stream and output it at output pad OUTA using the serial interface IF2 and output driver 216.

Similar as in FIG. 3, the circuit L1 of logic circuit 210 shown in FIG. 4 may be configured to receive a data via the serial interface IF1, process and/or decode the received data and store information in a non-volatile memory included in circuit L1. Optionally, the circuit L1 may be coupled to a watchdog circuit WDT (watchdog timer), which indicates (to circuit L1) that no data has been received from the coreless transformer CT1 by the receiver circuit 212 for a specific time interval. When the watchdog circuit WDT signals that the receiver circuit 212 has been inactive for the specific time interval, then the circuit L1 may control the multiplexer MUX to output a defined default value as mentioned above. The default value may be configurable and stored in the non-volatile memory. Various suitable implementations of the watchdog circuit as such are known and thus not further discussed herein.

Figure 5:
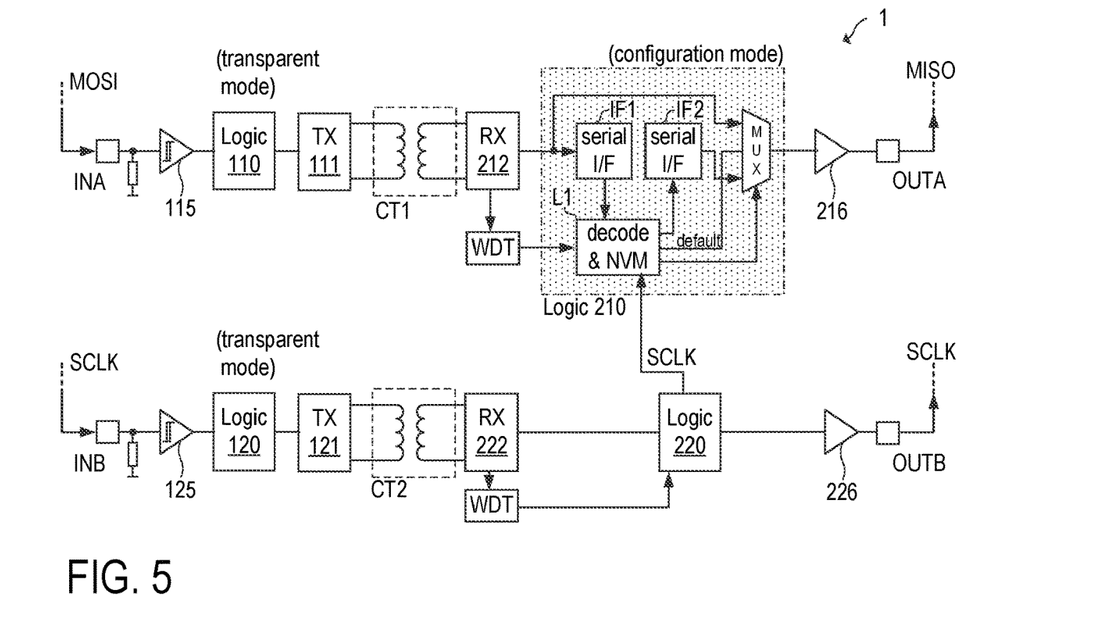
FIG. 5 illustrates the parametrization/configuration of an isolator IC using serial communication.

FIG. 5 illustrates the parametrization/configuration of an isolator IC 1 using serial communication, wherein the inputs of the two (forward) channels A and B receive a serial data stream MOSI and, respectively, a clock signal SCLK. The channels A and B are essentially implemented in the same way as shown in FIGS. 3 and 4 and reference is made to the description above. The terms "MOSI" (Master Out Slave In) and "SCLK" (Serial Clock) are common in the context of an SPI (Serial Peripheral Interface). However, similar/corresponding items exist in other bus systems and the examples described herein are not limited to any specific type of digital communication. The MOSI signal is a bit stream, which is provided by a controller (not shown) acting as bus master node and which is generated in synchronization with a clock signal. In the depicted example, the two channels A and B are used to receive a serial data signal MOSI and a clock signal SCLK at the respective input pads INA and, respectively, INB.

In the present example the logic circuit 120 (of channel B) is operated in transparent mode, so that the clock signal SCLK is transmitted across the coreless transformer CT2 into the other isolation domain. Similarly, the logic circuit 110 (of channel A) is operated in transparent mode, so that the serial data stream MOSI is transferred across the coreless transformer CT1 to the other isolation domain where it is received by the logic circuit 210. At the same time, the logic circuit 210 receives the clock signal SCLK from the logic circuit 220. That is, the two logic circuits 210 and 220 in the second isolation domain "share" the received clock signal. In transparent mode, the two logic circuits 110 and 120 in the first isolation domain are not clocked but merely feed through the input signals MOSI and SCLK. In the depicted example, the logic circuit 210 operates in configuration mode, in which it receives the serial data signal MOSI and the clock signal SCLK. Accordingly, the interface circuit IF1 of logic circuit 210 is capable of receiving the data included in the serial data stream (e.g. frame by frame) and the circuit L1 included in logic circuit 210 is capable of processing and interpreting the received data. In one embodiment, the received data includes configuration information that is stored in the non-volatile memory. The stored configuration information can be later used during normal operation, when all logic circuits are transparent to transmit, e.g. PWM signals from the input pads INA and INB to the corresponding output pads OUTA and OUTB, respectively. The configuration information may be used to customize the isolation IC. For this purpose, the configuration information may include parameters such as UVLO thresholds, default output states, direction of channels, characteristics of the output divers, or the like.

When, in the example, of FIG. 5, the logic circuit 110 is not operated in transparent mode but in configuration mode, configuration information can be received and stored by the logic circuit 110 in the same way as it has been explained above for logic circuit 210. As mentioned, the logic circuit 110 may be constructed essentially in the same way as logic circuit 210.

Figure 6:
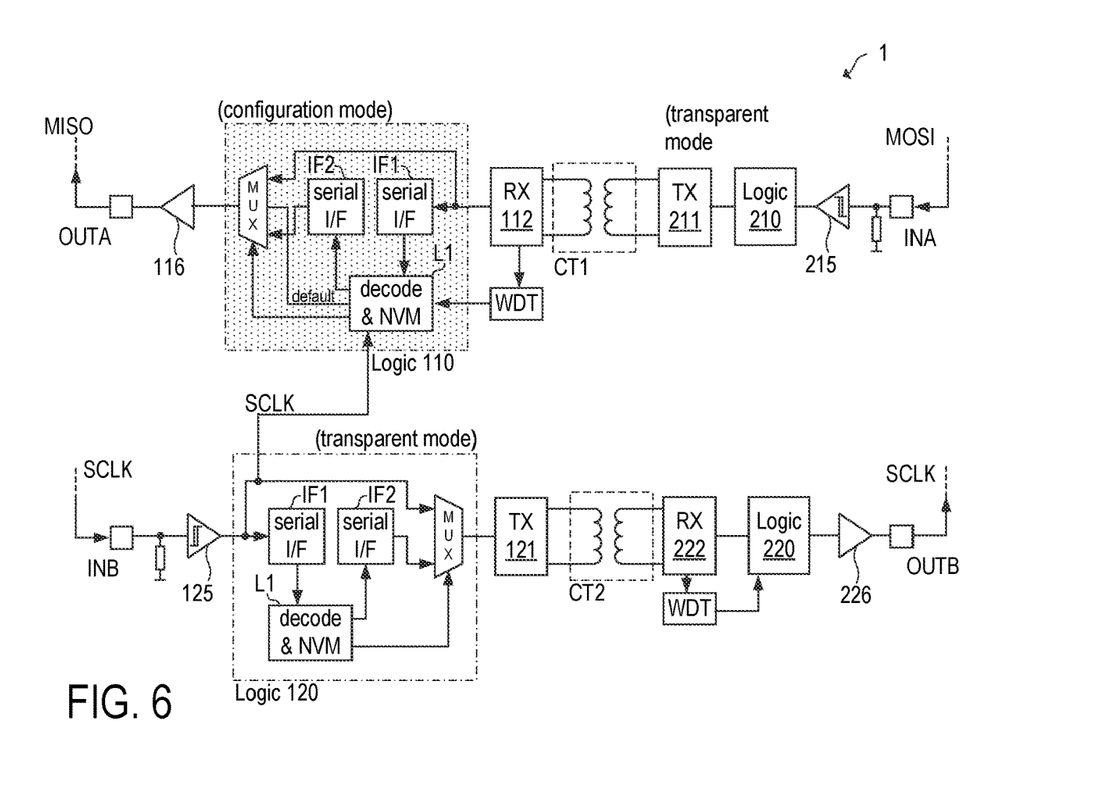
FIG. 6 illustrates an example similar to FIG. 5 but with a forward and a backward channel instead of two forward channels.

FIG. 5 illustrates an isolator IC in a 2+0 configuration (two forward channels). FIG. 6 illustrates an isolator IC in an 1+1 configuration with forward channel B and a backward channel A. In the example of FIG. 6, channel B is constructed basically in the same way as the forward channel B in FIG. 1 (Schmitt-Trigger 125, logic circuit 120, and transmitter circuit 121 in the isolation domain of semiconductor die 100, and receiver circuit 222, logic circuit 220, and output buffer 226 in the isolation domain of semiconductor die 200). Similarly, channel A includes Schmitt-Trigger 215, logic circuit 210, and transmitter circuit 211 in the isolation domain of semiconductor die 200, and receiver circuit 112, logic circuit 110, and output buffer 116 in the isolation domain of semiconductor die 100.

In FIG. 6, an external controller can send configuration information to logic circuits 210 and 110 in the same way as explained above with reference to FIG. 5. However, the serial data stream MOSI is supplied to the other isolation domain as compared with the previous example of FIG. 5. In FIG. 6, the non-volatile memory of logic circuit 110 can be accessed when logic circuit 110 is switched to configuration mode. It is noted that the clock signal SCLK may also be transferred via coreless transformer CT2 so that it can be received and used by logic circuits 210 and 220 to receive the serial data stream and configuration information encoded therein in a situation, in which logic circuit 110 is in transparent mode and logic circuit 210 is in configuration mode.

In both examples, FIGS. 5 and 6, the logic circuits 210 and 110 may generate a data stream MISO (using serial interface IF2) and output it at output pad OUTA via output driver 216 (and, in the example of FIG. 6, via coreless transformer CT2). This allows an external controller (the bus master node) to receive information from the logic circuit 210 or 110, respectively. The output data stream MISO may include configuration information currently stored in the memory or any other available status information of the isolator IC which may be of interest to the external controller. Additionally or alternatively, the logic circuits 210 and 110 may be configured to copy information stored in the non-volatile memory of logic circuit 210 to the non-volatile memory of logic circuit 110 (and vice versa). As mentioned, the logic circuits 110 and 120 may actually be implemented as one logic circuit and share the non-volatile memory (and also the interfaces IF1 and IF2). The same applies to logic circuits 210 and 220.

Figure 7:
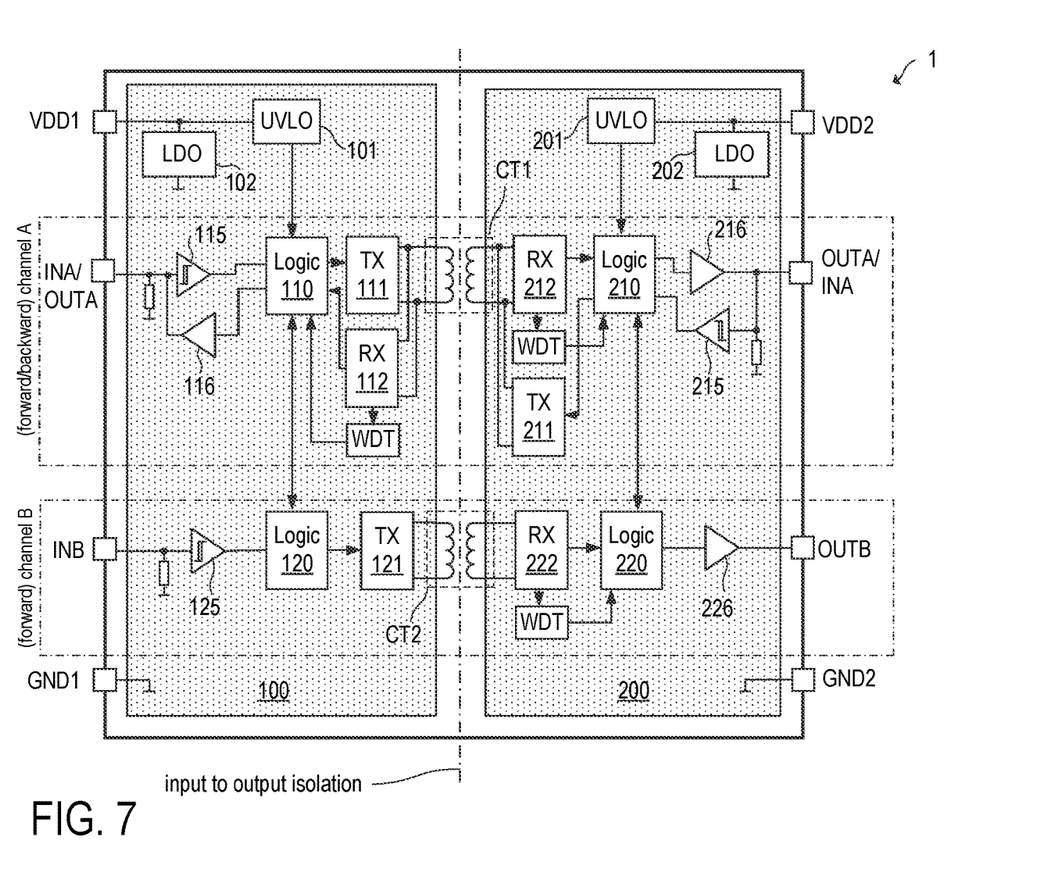
FIG. 7 illustrates another example of a dual-die isolation IC wherein one of the two channels is configurable as either forward or backward channel.

FIG. 7 illustrates another example of a dual-die isolation IC similar to FIG. 1, wherein, in the present example, channel A is configurable as either forward or backward channel Channel B is implemented in the same way as in FIG. 1. In the first semiconductor die 100 (first isolation domain) and in the channel A a transmitter circuit 111 and a receiver circuit 112 are connected between the coreless transformer CT1 and the logic circuit 110. Further, the comparator 115 and the driver 116 are connected between the logic circuit and the chip pin labelled INA/OUTA. Similarly, in the second semiconductor die 200 (second isolation domain) a transmitter circuit 211 and a receiver circuit 212 are connected between the coreless transformer CT1 and the logic circuit 210. Further, the comparator 215 and the driver 216 are connected between the logic circuit and the chip pin labelled OUTA/INA.

As mentioned, during configuration/parametrization of the isolation IC 1, the desired configuration information is supplied to the logic circuit(s) in the IC using serial communication. The configuration information may be used to customize the isolation IC and include parameters such as UVLO thresholds, default output states, characteristics of the output divers, or the like. In the example of FIG. 7, the configuration information can also include information as to whether channel A is to be used as forward or backward channel during normal operation. As mentioned, in normal mode the logic circuits 110, 210, 120, 220 are basically transparent and the logic signals received at the input pins INA and INB are basically forwarded to the output pins OUTA, OUTB, respectively, via the insulation barrier.

If channel A is configured as forward channel (i.e. to operate in a forward direction), the receiver circuit 112 and the transmitter circuit 211 as well as the comparator 215 and the output driver 116 are inactive, while the other components are active. Similarly, if channel A is configured as backward channel (i.e. to operate in a backward direction), the transmitter circuit 111 and the receiver circuit 212 as well as the comparator 115 and the output driver 216 are inactive, while the other components are active. In essence, the input INA and the output OUTA change their roles (as compared to forward operation) when the channel A is configured as backward channel. The logic circuits 110 and 210 may be configured such that channel A has a default direction and operates as forward channel unless reconfigured as backward channel Although not explicitly shown in FIG. 7, channel B may also be configurable as forward and backward channel in the same way as channel A.

Figure 8:
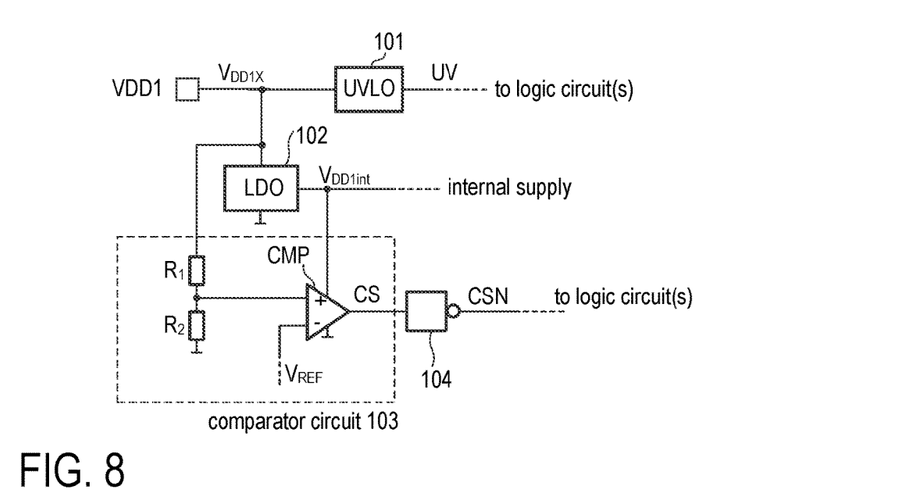
FIG. 8 illustrates an example of a chip-select circuit which may be used in the examples described herein.

As mentioned, the operating mode (e.g. transparent mode, configuration mode) of the logic circuits may be selected based on the voltage level received at the supply pins VDD1 and VDD2 associated with the respective isolation domains. FIG. 8 illustrates an example of a chip-select circuit which may be used to select the operating modes by applying a specific voltage level at the supply pins VDD1 or VDD2. The example of FIG. 8 may be used in connection with any embodiment described herein. However, different mode and chip select mechanisms may be implemented in other embodiments.

In FIG. 8, the voltage applied to the supply pin VDD1 is denoted as $V_{DD1X}$. the UVLO circuit 101 and the voltage regulator 102 are the same as shown in FIGS. 1, 2 and 7, and reference is made to the respective explanations above. For the following discussion, it is assumed that the nominal supply voltage is 5V and the voltage regulator 102 provides a regulated internal supply voltage $V_{DDint}$ of slightly less than 5V based on the voltage $V_{DD1X}$. When the supply voltage $V_{DD1X}$ applied to the input pin VDD1 is increased above a threshold value (which equals $(R_1+R_2)\cdot V_{REF}/R_2$ in the present example, see FIG. 8), then a comparator circuit 103 may signal a chip-select state. The mentioned threshold value may be, for example, 8V. That is, the condition $V_{DD1X}>8V$ causes a chip-select state in the present example.

As shown in FIG. 8, the comparator circuit 103 may include a voltage divider composed of resistors $R_1$ and $R_2$. The voltage divider provides the voltage $V_{DD1X}\cdot R_2/(R_1+R_2)$ to a comparator CMP that receives a reference voltage $V_{REF}$ as a second input signal. The comparator signals CMP a chip select state (e.g. by providing an output signal CS with a High Level) when $V_{DD1X}\cdot R_2/(R_1+R_2)>V_{REF}$, which is equivalent to the condition $V_{DD1X}>(R_1+R_2)\cdot V_{REF}/R_2$. Assuming—as an illustrative example—that $R_1$ and $R_2$ have equal resistance values and further assuming $V_{REF}=4V$ results in the mentioned condition of $V_{DD1X}>8V$, which needs to be fulfilled to signal the chip-select state.

In the example of FIG. 8, the logic signal CS is inverted by inverter 104. The inverted signal is denoted as CSN. This signal CSN may be used as chip-select signal in accordance with the SPI standard. The signals CS or CSN may be supplied to the logic circuits 110 and 120 (as mentioned the logic circuits of one isolation domain may be integrated as one logic circuit). The logic circuits may operate in transparent mode when CS=0 (equivalent to CSN=1) and may operate in configuration mode when CS=1 (equivalent to CSN=0). It is understood, that the circuit of FIG. 8 is integrated in semiconductor die 100 associated with one isolation domain and a similar circuit may be integrated in semiconductor die 200 of another isolation domain (see also FIG. 1).

In view of the above, in one embodiment, the integrated circuit may include a supply pin for each isolation domain (see FIG. 1, pins VDD1 and VDD2), and the integrated circuit may be configured to select the operating mode of the logic circuit(s) based on the voltage level of the supply voltage (e.g. $V_{DD1X}$ in the example of FIG. 8). In one specific embodiment, the integrated circuit may include a chip-select circuit, which is configured to provide a chip-select (or mode-select) signal for the logic circuits dependent on the supply voltage applied to one of the supply pins. For example, the chip-select circuit may be implemented using a comparator circuit as shown in FIG. 8.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

The invention claimed is:

1. An integrated circuit comprising:
   a galvanic insulation barrier including a first isolation element operative to separate a first isolation domain from a second isolation domain;
   a first channel operative to transmit—in a first mode of operation and across the first isolation element—a first logic signal from a first input in the first isolation domain to a first output in the second isolation domain and further operative to transmit—in a second mode of operation and across the first isolation element—a first serial data stream from the first input to a first logic circuit in the second isolation domain;
   a second channel operative to transmit—in the first mode of operation and across a second isolation element of the galvanic insulation barrier—a second logic signal from a second input to a second output and further operative to direct—in the second mode of operation—a clock signal received at the second input to the first logic circuit; and
   wherein the first logic circuit is operative to receive—in the second mode of operation—the first serial data stream and to store configuration information included in the first serial data stream in a first memory.

2. The integrated circuit of claim 1, wherein the first logic circuit is operative to receive the first serial data stream in synchronization with the clock signal.

3. The integrated circuit of claim 1, wherein the first logic circuit includes a multiplexer operative to pass the first logic signal received via the first isolation element through the first logic circuit in the first mode of operation.

4. The integrated circuit of claim 1, wherein the first channel is operative to operate—in the first mode of operation and based on the received configuration information—in a forward direction and in a backward direction, in which the first input and the first output change roles.

5. The integrated circuit of claim 1 further comprising:

a second logic circuit in the first isolation domain, the second logic circuit operative to receive the—in the second mode of operation—the first serial data stream from the first input;
wherein the second logic circuit is operative to store configuration information included in the first serial data stream in a second memory.

6. The integrated circuit of claim 5, wherein the second logic circuit is operative to generate a second data stream based on configuration information stored in the second memory; and
wherein the first channel is operative to transmit the second data stream via the first isolation element to the first logic circuit in the second isolation domain.

7. The integrated circuit of claim 1 further comprising:
a first under-voltage lockout circuit in the first isolation domain and a second under-voltage lockout circuit in the second isolation domain; and
wherein the configuration information includes a first under-voltage threshold for the first under-voltage lockout circuit and a second under-voltage threshold for the second under-voltage lockout circuit.

8. The integrated circuit of claim 1, wherein the first isolation element includes a single transformer.

9. The integrated circuit of claim 1 further comprising:
a watchdog circuit in the second isolation domain, the watchdog circuit coupled to the first logic circuit;
wherein the watchdog circuit is operative to signal, to the first logic circuit, that no signal has been received from the first isolation element for a predetermined time span; and
wherein the first logic circuit is operative to output a defined signal level when the watchdog circuit signals that no signal has been received from the first isolation element for a predetermined time span.

10. A method comprising:
transmitting—in a first mode of operation of an integrated circuit and across a first isolation element of the integrated circuit—a first logic signal from a first input in a first isolation domain of the integrated circuit to a first output in a second isolation domain of the integrated circuit, the first isolation domain and the second isolation domain being separated by a galvanic insulation barrier including a first isolation element;
transmitting—in a second mode of operation and across the first isolation element—a first serial data stream from the first input to a first logic circuit in the second isolation domain;
receiving—by the first logic circuit and in the second mode of operation—the first serial data stream and storing configuration information included in the first serial data stream in a first memory;
transmitting—in the first mode of operation and across a second isolation element of the galvanic insulation barrier—a second logic signal from a second input to a second output; and
directing—in the second mode of operation—a clock signal received at the second input to the first logic circuit.

11. The integrated circuit of claim 10 further comprising:
receiving—by the first logic circuit—the first serial data stream in synchronization with the clock signal.

12. The method of claim 10 further comprising:
passing the first logic signal received via the first isolation element through the first logic circuit in the first mode of operation.

13. The method of claim 10, wherein the first input and the first output are associated with a first channel; and
wherein the method further comprises operating—in the first mode of operation and based on the received configuration information—the first channel in a forward direction and in a backward direction, in which the first input and the first output change roles.

* * * * *